May 29, 1956

V. A. BREITENBACH 2,747,774

FLUID STORAGE SYSTEM

Filed Oct. 31, 1952

INVENTOR.
VERNON A. BREITENBACH

BY
*his* ATTORNEYS.

United States Patent Office 2,747,774
Patented May 29, 1956

2,747,774
FLUID STORAGE SYSTEM

Vernon A. Breitenbach, Maple Heights, Ohio, assignor to The Standard Oil Company, Cleveland, Ohio, a corporation of Ohio Application October 31, 1952, Serial No. 318,001

2 Claims. (Cl. 222—395)

This invention relates to the storage of fluid products, particularly those which are combustible or volatile.

Many of the problems which are involved in the storage of fluids such as various petroleum products, for example, are at least partially solved by the use of underground storage facilities. Such facilities afford natural temperature control, which reduces losses due to vaporization. They also afford relative safety both from situations which might cause explosions and from the danger to life and property attendant on such mishaps.

Underground storage systems, however, are themselves costly to construct and their maintenance and operation may be troublesome.

It is, therefore, one object of this invention to provide an improved system for storing fluids which is relatively safe, inexpensive and efficient.

It is another object of the invention to provide a storage system utilizing natural or artificial bodies of water as the enveloping medium.

In accordance with the invention, a storage vessel may be submerged in a body of water such as a lake, river, harbor or the like, ballasting being used as might be necessary to force the container beneath the water surface. The storage vessel will find its support on the bottom of the body of the water. A plurality of conduits are connected to the vessel, at least one conduit being adapted to accommodate the fluid to be stored, and at least one other to accommodate water which may be used as a cooperating fluid to displace or to be displaced by the fluid to be stored.

So that walls of only the lightest and thinnest construction might be used for the closed vessel, thereby reducing materially the cost of the installation, the fluid within the vesel may be kept under a hydrostatic pressure corresponding approximately to the external hydrostatic pressure on the vessel. To this end means may be provided for maintaining the water conduit substantially filled with water at all times.

Figure 1:
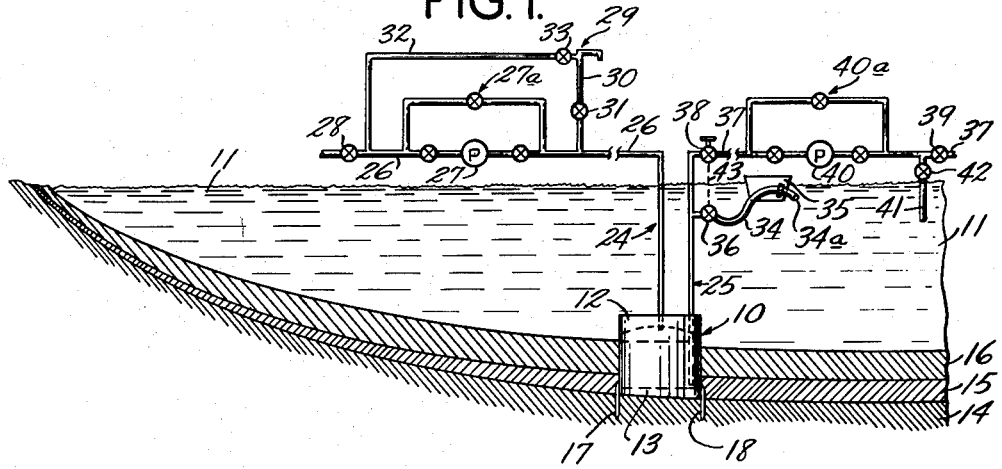
Figure 2:
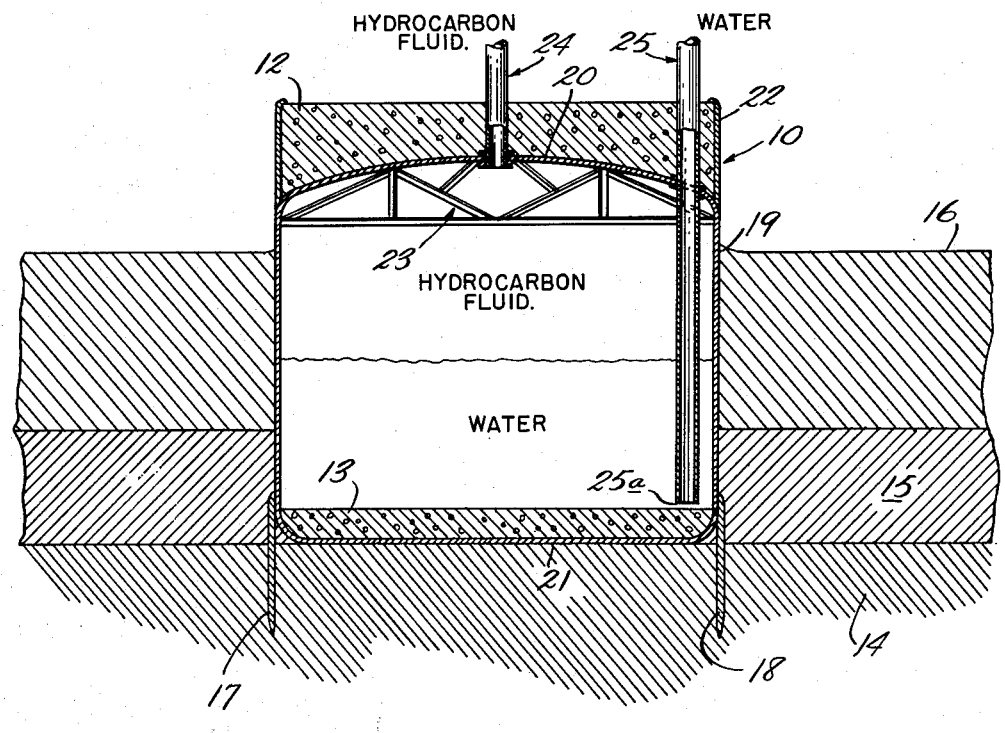

The invention may be better understood by referring to the following specification taken with reference to the accompanying drawing, in which:

Figure 1 is a diagrammatic view of a storage vessel formed in accordance with the present invention and disposed in a body of water, and Figure 2 is a view in vertical section of the storage vessel of Figure 1.

Referring to the drawing, the invention is illustrated as comprising a storage vessel 10, described in detail below, disposed at the bottom of a body of water 11, which may be either natural or artificial as dictated by prevailing conditions. The storage vessel 10 is preferably ballasted by means such, for example, as concrete masses 12 or 13, or both, causing the vessel to find its support on the firm layer 14 beneath the body of water. In some formations, such as that given as illustrative, the layer 14 may be covered by a clay stratum 15 and a silt stratum 16 in which the storage vessel will be embedded, as shown in the drawing. To anchor the vessel against lateral movement, depending feet 17 and 18 may be affixed to its underside which will embed themselves in the firm layer 14.

Structurally, the storage vessel 10 may comprise a relatively light, fully closed shell including a cylindrical wall 19, an upper surface 20, and a lower surface 21 which may be formed, for example, of relatively thin sheet steel suitably protected against corrosion, or of plastic, rubber or the like. The upper surface of the vessel may be provided with a skirt portion 22 to contain the ballast 12 and, in order that the ballast may be supported in this position without damage to the thin walled vessel, the upper surface 20 of the vessel may be suitably reinforced by trusswork indicated generally by the numeral 23. Such trusswork may include horizontal and vertical supports. If desired a suitable manhole or other closure means (not shown) may be provided in the vessel for purposes such as cleaning and installing the lower ballast 13. It will be understood, however, that the storage vessel is completely closed when in operation, save for the communication established therewith by conduit means 24 and 25 connected to external facilities as described below.

The conduit means 24 is adapted to convey the fluid to be stored to and from the vessel and, as best seen in Fig. 2, may include a pipe communicating with the upper regions of the storage vessel, preferably attached to the upper surface 20 thereof. The fluid to be stored should be non-miscible with water and of lower specific gravity such as lubricating and fuel oils, kerosene, naphtha, gasoline, liquid petroleum, gas, etc.

The conduit means 25 is adapted to convey water to and from the vessel and may include a pipe communicating with the lower regions of the vessel, preferably by entering the vessel through its upper surface 20 and passing downwardly therethrough so that its discharge opening 25a is disposed close to the bottom surface 21.

The conduit means 24 for the storage fluid can be connected to a shore installation (not shown) through a conduit 26 and a pump 27 having a by-pass valve assembly 27a and a shut-off valve 28. The pump may be disposed on the shore or at an intermediate point such as on a barge, float or pier. Barge connections 29 can be provided for loading and unloading barges and these connections can be tied to the pipe line 26 through a line 30 having a valve 31 shunting the pump 27 and through a line 32 having a valve 33 connected in series with the pump 27 and the vessel.

The conduit means 25 for the water may be connected to a suitable source of water which may be the body of water 11. In this case a flexible hose 34 may be supported by a float 35 to have its discharge end 34a maintained at a position to avoid introducing silt into the vessel and to avoid attracting debris floating on or near the surface of the water. A valve 36 can be disposed between the flexible hose 26 and the conduit means 25. It will be understood that the hydrostatic head on the contents of the vessel will be maintained at a maximum value closely approximating that on the outside of the vessel.

Also connected to the conduit means 25 is a pipe line 37 including valves 38 and 39 and a pump 40, having suitable by-pass connections 40a, the pipe line 37 leading either to a source of water (not shown) other than the body of water 11, such for example as a fresh water supply ashore or alternatively to the body of water 11 through a pipe line 41 having a valve 42. For convenience, the valves 36 and 38 can be connected together by a mechanical linkage 43 so as to be operated in reverse tandem, one closing and one opening for any given hand of rotation of the control means.

Pumping may be accomplished in any one of several ways or by a combination of ways utilizing the pumps 27 and 40 connected respectively to the fluid and water conduit means 24 and 25. The filling and emptying operations may be carried out by either pump or by both pumps, as desired, it being required in any event that the several valves in the system be adjusted to afford a complete circuit between the water source and the storage fluid source. Assuming by way of example that the vessel 10 is initially filled with water, the fluid to be stored may be pumped into the vessel through the conduit means 24 to replace the water.

As a first example of how this may be done, it will be assumed that the source of fluid to be stored is derived from the shore installations. Assuming the source of the fluid is not under pressure, the pump 27 will be connected in series with the pipe line 26, the valve 28 being opened and the pump by-pass valve 27a and the barge connection valves 31 and 33 closed. This will enable the pump 27 to suck the fluid from its source and force it via the conduit means 24 into the storage vessel 10. The water discharge from the vessel due to displacement by the fluid to be stored can be accommodated by closing the valve 38 and opening the valve 36 to discharge the water into the body of water 11 through the flexible hose 34.

Alternatively, the pump 27 in the conduit means 24 may be by-passed by means of the by-pass connections 27a and the pump 40 in the water conduit means 25 used. In this case the valve 36 will be closed and the valve 38 opened. The discharge from the pump 40 can be by way of the pipe 41 to the body of water 11, the valve 42 being open and the valve 39 closed. The by-pass connections 40a of the pump 40 will be closed. The pump 40 will then operate as a suction pump drawing the water from the vessel 10 and causing the fluid to be stored to be drawn into the vessel.

The methods outlined above may be duplicated in reverse to cause the fluid product to be removed from the vessel. Thus the pump 27 can be used as a suction pump to withdraw the fluid from storage and to cause water to be drawn into the vessel and the pump 40 can be used to force water into the vessel to displace the fluid. In certain cases it will be possible to use a source of water under pressure, such as in fresh water supply mains, to force the fluid out. In the latter case valves 42 and 36 will be closed and valves 38, 39 and 40a opened.

It will be understood that the two pumps 27 and 40 may, if necessary, be used in series, one pulling and the other pushing.

Also, the barge connections 29 may be serviced using any of the combinations of pumping means described above, or, if desired, the barge may use its own pump, if any.

In all cases it will be understood that the arrangement of the conduits is such that the hydrostatic pressure within the vessel is maintained substantially equal to the hydrostatic pressure outside the vessel so that the structure of the vessel may be relatively light and its initial cost kept at a minimum.

Thus a highly effective means of storing various fluids is provided in which the temperature will be maintained substantially constant over long periods of time, that is, will not vary appreciably between day and night, and will not vary widely over the seasons of the year, in which the bulk of the assembly is completely concealed from view and out of harm's way, and in which the vessel is relatively light and inexpensive to install and maintain.

Other forms, embodiments and applications of the invention coming within the proper scope of the following claims will readily suggest themselves to those skilled in the art.

I claim:

1. In a storage vessel system for a fluid lighter than water and immiscible therewith, in combination, a storage vessel disposed in a body of water, the vessel being closed on all sides except for the entry of the hereafter mentioned conduits and weighted to rest on a formation at the bottom of the body of water so as to be fully enveloped thereby, first conduit means for the fluid product to be stored, said first conduit means having one end communicating with the inside of the closed vessel near the upper end thereof and having another end to receive and discharge the fluid, second conduit means comprising a stand pipe having one of its ends communicating with the inside of the vessel near the lower end thereof and having another end disposed above the vessel and near the surface of said body of water and adapted to receive and discharge water, whereby water may enter and leave the closed vessel only through the second conduit means, means affording a water input to said second conduit means for maintaining a hydrostatic head on the contents within the vessel which will substantially counteract the hydrostatic pressure on the outside of the vessel, and pumping means connected to said vessel for establishing a flow of the fluid product into and out of the vessel through the first conduit means and for correspondingly establishing a flow of water respectively out of and into the vessel through the second conduit means, whereby the inflow of water to the vessel via the stand pipe is maintained relatively free of silt or the like.

2. In a storage vessel system as set forth in claim 1 including a length of flexible conduit connected to said another end of the stand pipe, and float means connected to the free end of the flexible conduit to maintain said free end at a fixed predetermined distance below the surface of the body of water.

References Cited in the file of this patent

UNITED STATES PATENTS

| 2,321,976 | Black | June 15, 1943 |
| 2,337,472 | Kares | Dec. 21, 1943 |

FOREIGN PATENTS

| 35,055 | France | June 18, 1929 |